US008160314B2

(12) United States Patent
Ramamurthy et al.

(10) Patent No.: US 8,160,314 B2
(45) Date of Patent: Apr. 17, 2012

(54) SYSTEM AND METHOD FOR LINKING VOIS ACROSS TIMEPOINTS FOR ANALYSIS OF DISEASE PROGRESSION OR RESPONSE TO THERAPY

(75) Inventors: Venkat Raghavan Ramamurthy, Malvern, PA (US); Arun Krishnan, Exton, PA (US); Christian Beldinger, Algonquin, IL (US); Juergen Soldner, Knoxville, TN (US); Maxim Mamin, Erlangen (DE); Axel Barth, Erlangen (DE); Stefan Käpplinger, Jena (DE); Michael Gluth, McHenry, IL (US); Peggy Hawman, Schaumburg, IL (US); Darrell Burckhardt, Hoffman Estates, IL (US); Axel Platz, München (DE)

(73) Assignees: Siemens Aktiengesellschaft, Munich (DE); Siemens Medical Solutions USA, Inc., Malvern, PA (US)

( * ) Notice: Subject to any disclaimer, the term of this patent is extended or adjusted under 35 U.S.C. 154(b) by 1010 days.

(21) Appl. No.: 11/146,966

(22) Filed: Jun. 7, 2005

(65) Prior Publication Data
US 2006/0025669 A1    Feb. 2, 2006

Related U.S. Application Data

(60) Provisional application No. 60/581,136, filed on Jun. 18, 2004.

(51) Int. Cl.
*G06K 9/00* (2006.01)

(52) U.S. Cl. ............. 382/128; 382/131; 382/132

(58) Field of Classification Search ............ 382/128, 382/131, 132, 130, 154, 294; 378/901; 715/700
See application file for complete search history.

(56) References Cited

U.S. PATENT DOCUMENTS

| | | | | |
|---|---|---|---|---|
| 6,363,163 | B1 * | 3/2002 | Xu et al. ............. | 382/130 |
| 7,130,457 | B2 * | 10/2006 | Kaufman et al. ............. | 382/128 |
| 2003/0053668 | A1 * | 3/2003 | Ditt et al. ............. | 382/128 |
| 2005/0065421 | A1 | 3/2005 | Burckhardt | |

OTHER PUBLICATIONS

Edited by Josepyh Hajnal, Derek Hill, David Hwkes; Medical Image REgistration 2001; CRC Press LLC; pp. 199, 200, 217-218.*
"VETOT: Volume Estimation and Tracking Over Time", Guyon, Online! 2003, retrieved from the internet, http://caddlab.rad.unc.edu/software/Vetot/vetot.html.
"VETOT, Volume Estimation and Tracking Over Time: Framework and Validation", Guyon et al., Lecture Notes in Computer Science; Medical Image Computing and Computer-Assisted Intervention, MICCAI 2003—6th International Conference Proceedings 2003, vol. 2879, No. PART 2, 2003, pp. 142-149.

(Continued)

*Primary Examiner* — Claire X Wang
(74) *Attorney, Agent, or Firm* — Peter Withstandley

(57) ABSTRACT

A system and method for linking volumes of interest (VOIs) across timepoints are provided. The method comprises: loading an image dataset of a first timepoint and an image dataset of a second timepoint; registering the image dataset of the first timepoint and the image dataset of the second timepoint; displaying the image dataset of the first timepoint and the image dataset of the second timepoint; selecting a VOI in the image dataset of the first timepoint and the image dataset of the second timepoint; and linking the VOIs in the image dataset of the first timepoint and the image dataset of the second timepoint.

7 Claims, 10 Drawing Sheets

OTHER PUBLICATIONS

"A Survey of Medical Image Registration", Maintz et al., Medical Image Analysis, Oxford University Press, Oxford, GB, vol. 2, No. 1, 1998, pp. 1-37.

"Valmet: A New Validation tool for assessing and improving 3D object segmentation", Gerig et al., MICCAI 2001, LNCS 2208, 2001, pp. 516-523.

International Search Report including Notification of Transmittal of the International Search Report, International Search Report and Written Opinion of the International Searching Authority, PCT Application No. PCT/US2005/020865, mailed Jan. 20, 2006.

VETOT, Jean-Philippe Guyon: "Volume estimation and Tracking Over time (online)", May 17, 2004 (Searched Feb. 15, 2010) URL: http://web.archive.org/web/20040517063718/http:/caddlab.rad.unc.edu/software/Vetot/vetot.html#.

Japanese Office Action dated Mar. 2, 2010 in Application No. 2007-516622 (English Translation included).

Chinese Office Action dated May 12, 2010 in Application No. 200580028035.5.

* cited by examiner

SYSTEM AND METHOD FOR LINKING VOIS ACROSS TIMEPOINTS FOR ANALYSIS OF DISEASE PROGRESSION OR RESPONSE TO THERAPY

CROSS-REFERENCE TO RELATED APPLICATION

This application claims the benefit of U.S. Provisional Application No. 60/581,136, filed Jun. 18, 2004, a copy of which is herein incorporated by reference.

BACKGROUND OF THE INVENTION

1. Technical Field

The present invention relates to medical image analysis, and more particularly, to a system and method for linking volumes of interest (VOIs) across timepoints for analysis of disease progression or response to therapy.

2. Discussion of the Related Art

Functional imaging using single photon emission computed tomography (SPECT) and positron emission tomography (PET) is extremely valuable in the diagnosis of various medical disorders. Uncertainty in the anatomic definition on SPECT and PET images, however, sometimes limits their usefulness. To overcome this, a combination of magnetic resonance images (MRI) and X-ray computed tomography (CT) images with functional SPECT or PET images of the same sections of the body is sometimes used. This provides complementary anatomic (MRI or CT) and physiological (SPECT or PET) information that is of great importance to research, diagnosis and treatment.

Functional body images and structural images are two types of medical images used by medical practitioners for the diagnosis of certain medical disorders. Functional body images such as those derived from SPECT or PET scans, provide physiological information, whereas structural images such as those derived from CT or MRI, provide an anatomic map of the body. Different medical imaging techniques may provide scans with complementary and occasionally conflicting information. For example, the combination of such images (via image fusion or image registration) using picture archiving communications systems (PACS) can often lead to additional clinical information not apparent in the separate images. Thus, by imposing a structural anatomic framework on a set of functional images, the position of a tumor or other lesion in a later functional image may be determined even where there is insufficient anatomic detail.

Although the construction of a composite, overlapping medical image with image registration has been primarily used in the fusion of functional and anatomical images, it has also been applied to a series of the same modality of images. Examples of this are registration of SPECT images of the same subject in follow-up studies or in a comparison of an image with normal uptake properties to an image with suspected abnormalities. In addition, image registration of SPECT and PET images and the registration of SPECT and PET images with anatomic atlases provide an important means to evaluate comparative uptake properties of SPECT and PET radiopharmaceuticals, and to correlate uptake properties with anatomy.

Multi-modal medical image registration is fast becoming a visualization tool that can significantly aid in the early detection of tumors and other diseases and aid in improving the accuracy of diagnosis. For example, radiologists often have difficulty locating and accurately identifying cancer tissue, even with the aid of structural information such as CT and MRI because of the low contrast between the cancer and the surrounding tissues in CT and MRI images. However, by using SPECT and radioactively labeled monoclonal antibodies it is possible to obtain high contrast images of the concentration of antibodies in tumors.

It is thus becoming increasingly desirable to combine the output and strengths of multiple medical imaging systems. However, certain drawbacks exist due to combining different file structures, the transfer and networking thereof and registration and visualization of the composite images. For example, such systems typically do not support more than a few combinations of datasets from different modalities. In addition, many systems do not provide a quick and accurate means for analyzing changes in tumors. Further, many systems do not provide a quick technique for aligning medical images from different timepoints. For example, to accurately analyze changes in tumors, it is often necessary to compare images of the same modality that were scanned at different timepoints.

Accordingly, there is a need for a technique that enables medical practitioners to compare patient scans taken at a different times using the same or different modalities so that medical practitioners can make better-informed diagnostic, therapy and follow-up decisions in a cost-effective and efficient manner.

SUMMARY OF THE INVENTION

The present invention overcomes the foregoing and other problems encountered in the known teachings by providing a system and method for linking volumes of interest (VOIs) across timepoints for analysis of disease progression or response to therapy.

In one embodiment of the present invention, a method for linking volumes of interest (VOIs) across timepoints, comprises: loading an image dataset of a first timepoint and an image dataset of a second timepoint; registering the image dataset of the first timepoint and the image dataset of the second timepoint; displaying the image dataset of the first timepoint and the image dataset of the second timepoint; selecting a VOI in the image dataset of the first timepoint and the image dataset of the second timepoint; and linking the VOIs in the image dataset of the first timepoint and the image dataset of the second timepoint.

The image dataset of the first timepoint and the image dataset of the second timepoint each comprise data acquired from one of a computed tomography (CT), positron emission tomography (PET), single photon emission computed tomography (SPECT), magnetic resonance (MR) and ultrasound modality.

The image dataset of the first timepoint and the image dataset of the second timepoint each comprise one of a CT image series and MR image series, a PET image series and SPECT image series, a combination of a CT and PET image series, a combination of an MR and PET image series, a combination of a CT and SPECT image series, a combination of an MR and SPECT image series and an ultrasound image series.

The image series in the image dataset of the first timepoint and the image dataset of the second timepoint each comprise data from one of a pre-therapy, ongoing therapy and post-therapy study. The first image dataset and the second image dataset are registered using one of automatic registration, landmark registration and visual registration.

The VOI is selected by a user. The VOI is one of a lesion, tumor and cancerous region. The image dataset of the first timepoint and the image dataset of the second timepoint are displayed for comparison.

The method further comprises quantifying the VOIs, wherein the quantification is one of a minimum deviation, maximum deviation, standard deviation, average, volume, mean, diameter, area, number of pixels and centroid.

In another embodiment of the present invention, a method for linking volumes of interest (VOIs) across timepoints, comprises: loading an image dataset of a first timepoint and an image dataset of a second timepoint; registering the image dataset of the first timepoint and the image dataset of the second timepoint; displaying the image dataset of the first timepoint and the image dataset of the second timepoint; selecting a VOI in the image dataset of the first timepoint; copying the VOI from the image dataset of the first timepoint to the image dataset of the second timepoint; and linking the VOIs in the image dataset of the first timepoint and the image dataset of the second timepoint.

The image dataset of the first timepoint and the image dataset of the second timepoint each comprise data acquired from one of a computed tomography (CT), positron emission tomography (PET), single photon emission computed tomography (SPECT), magnetic resonance (MR) and ultrasound modality.

The image dataset of the first timepoint and the image dataset of the second timepoint each comprise one of a CT image series and MR image series, a PET image series and SPECT image series, a combination of a CT and PET image series, a combination of an MR and PET image series, a combination of a CT and SPECT image series, a combination of an MR and SPECT image series and an ultrasound image series.

The image series in the image dataset of the first timepoint and the image dataset of the second timepoint comprise data from one of a pre-therapy, ongoing therapy and post-therapy study.

The VOI is selected by a user. The VOI is one of a lesion, tumor and cancerous region. The method further comprises quantifying the VOIs and detecting a change in the VOIs.

In yet another embodiment of the present invention, a system for linking volumes of interest (VOIs) across timepoints, comprises: a memory device for storing a program; a processor in communication with the memory device, the processor operative with the program to: load an image dataset of a first timepoint and an image dataset of a second timepoint; register the image dataset of the first timepoint and the image dataset of the second timepoint; display the image dataset of the first timepoint and the image dataset of the second timepoint; identify a VOI in the image dataset of the first timepoint and the image dataset of the second timepoint; and link the VOIs in the image dataset of the first timepoint and the image dataset of the second timepoint.

The image dataset of the first timepoint and the image dataset of the second timepoint each comprise data acquired from one of a computed tomography (CT), positron emission tomography (PET), single photon emission computed tomography (SPECT), magnetic resonance (MR) and ultrasound modality.

In an embodiment of the present invention, a system for linking volumes of interest (VOIs) across timepoints, comprises: a memory device for storing a program; a processor in communication with the memory device, the processor operative with the program to: load an image dataset of a first timepoint and an image dataset of a second timepoint; register the image dataset of the first timepoint and the image dataset of the second timepoint; display the image dataset of the first timepoint and the image dataset of the second timepoint; identify a VOI in the image dataset of the first timepoint; copy the VOI from the image dataset of the first timepoint to the image dataset of the second timepoint; and link the VOIs in the image dataset of the first timepoint and the image dataset of the second timepoint, wherein the image dataset of the first timepoint and the image dataset of the second timepoint each comprise data acquired from one of a computed tomography (CT), positron emission tomography (PET), single photon emission computed tomography (SPECT), magnetic resonance (MR) and ultrasound modality.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Exemplary embodiments of the present invention are directed to a multi-modality application that allows the comparison of two or more studies to each other. This is typically done by comparing an initial diagnosis with a follow-up scan after treatment. For example, the present invention may be used in oncology cases where one or several follow-up studies are performed to evaluate disease progression and response to therapy. The present invention may also be applied in medical modalities where change detection can be used to detect lesions, tumors, cancers, etc.

For example, the present invention may be used in the following areas of medical imaging: therapy response monitoring by performing change detection using computed tomography (CT) or Magnetic Resonance (MR) images—positron emission tomography (PET) or CT—single photon emission computed tomography (SPECT) over time; bone cancer detection by performing bone segmentation and lesion detection; liver cancer detection using perfusion and spectroscopy; breast cancer detection combining perfusion and spectroscopy and characterizing benign or malignant tumors; and neurology by using semi-automatic and automatic tools for volumetry of brain structures like hippocampal volumes.

The modalities for use with the present invention are, for example: static attenuation corrected (AC) PET, static non-attenuation corrected (NAC) PET and respiratory-gated PET; static AC SPECT or nuclear medicine (NM) and static NAC SPECT or NM; high-resolution CT, low-resolution CT, spiral CT and respiratory-gated CT; high-resolution magnetic resonance (MR); and ultrasound. The present invention may load gantry-titled datasets. In addition, the present invention is capable of accepting an image series containing unequally spaced slices or an image series containing overlapping slices.

The present invention may further load static AC PET or static NAC PET datasets fused together with corresponding registered CT datasets from one patient study, acquired via a PET/CT scanner or on separate devices. In addition, static AC SPECT or static NAC SPECT datasets fused together with corresponding registered CT datasets from one patient study, acquired via a SPECT/CT scanner or on separate devices may be loaded. Further, two series of the same modality type may be loaded and displayed fused within a single timepoint. For example, the present invention may allow a CT dataset fused together with another CT dataset, where both datasets were acquired via the same CT scanner or different devices.

Figure 1:
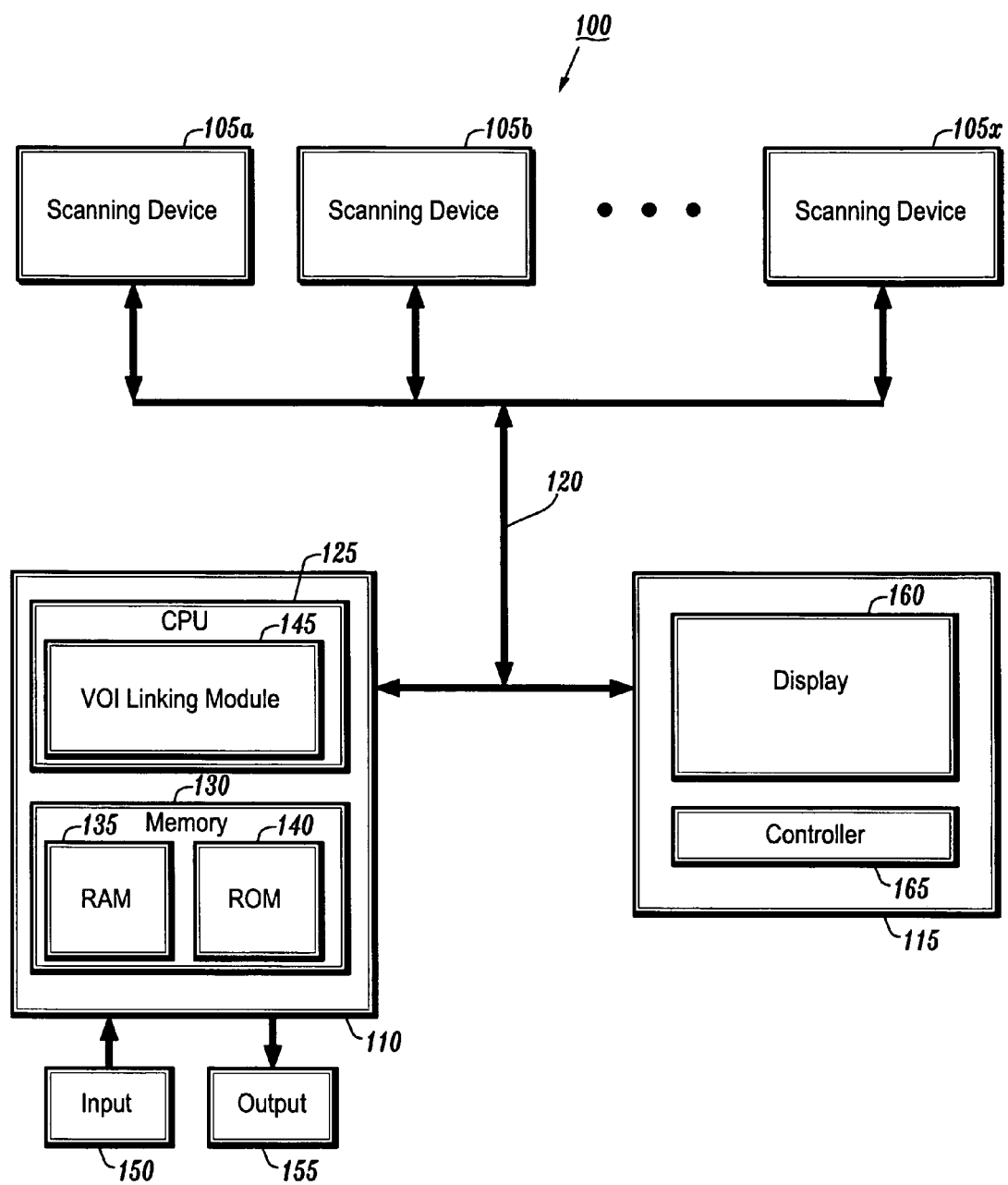
FIG. 1 is a block diagram of a system for linking volumes of interest (VOIs) across timepoints according to an exemplary embodiment of the present invention.

FIG. 1 is a block diagram of a system 100 for linking volumes of interest (VOIs) across timepoints for analysis of disease progression or response to therapy according to an exemplary embodiment of the present invention.

As shown in FIG. 1, the system 100 includes, inter alia, several scanning devices 105a, b ... x, a computer 110 and an operator's console 115 connected over a network 120. The scanning devices 105a, b ... x may each be one of an MR imaging device, CT imaging device, helical CT device, PET device, SPECT device, hybrid PET-CT device, hybrid SPECT-CT device, two-dimensional (2D) or three-dimensional (3D) fluoroscopic imaging device, 2D, 3D, or four-dimensional (4D) ultrasound imaging device, or an x-ray device. In addition to the aforementioned scanning devices, one or all of the scanning devices 105a, b ... x may be a multi-modal or hybrid scanning device that is capable of scanning, for example, in a PET mode, SPECT mode or MR mode or generate PET and CT scans from a single hybrid device.

The computer 110, which may be a portable or laptop computer, a personal digital assistant (PDA), etc., includes a central processing unit (CPU) 125 and a memory 130, which are connected to an input 150 and an output 155. The CPU 125 includes a VOI linking module 145 that includes one or more methods for linking VOIs across timepoints for analysis of disease progression or response to therapy.

The memory 130 includes a random access memory (RAM) 135 and a read only memory (ROM) 140. The memory 130 can also include a database, CD, DVD, disk drive, etc., or a combination thereof. The RAM 135 functions as a data memory that stores data used during execution of a program in the CPU 125 and is used as a work area. The ROM 140 functions as a program memory for storing a program executed in the CPU 125. The input 150 is constituted by a keyboard, mouse, etc., and the output 155 is constituted by a liquid crystal display (LCD), cathode ray tube (CRT) display, or printer.

The operation of the system 100 is controlled from the operator's console 115, which includes a controller 165, for example, a keyboard, and a display 160, for example, a CRT display. The operator's console 115 communicates with the computer 110 and the scanning device 105 so that 2D image data collected by the scanning devices 105a, b ... x can be rendered into 3D data by the computer 110 and viewed on the display 160. It is to be understood that the computer 110 can be configured to operate and display information provided by the scanning devices 105a, b ... x absent the operator's console 115, using, for example, the input 150 and output 155 devices to execute certain tasks performed by the controller 165 and display 160.

The operator's console 115 further includes any suitable image rendering system/tool/application that can process digital image data of an acquired image dataset (or portion thereof) to generate and display 2D and/or 3D images on the display 160. More specifically, the image rendering system may be an application that provides 2D/3D rendering and visualization of medical image data, and which executes on a general purpose or specific computer workstation. The computer 110 may also include an image rendering system/tool/application for processing digital image data of an acquired image dataset to generate and display 2D and/or 3D images.

As shown in FIG. 1, the VOI linking module 145 may also be used by the computer 110 to receive and process digital medical image data, which as noted above, may be in the form of raw image data, 2D reconstructed data (e.g., axial slices), or 3D reconstructed data such as volumetric image data or multiplanar reformats, or any combination of such formats. The data processing results can be output from the computer 110 via the network 120 to an image rendering system in the operator's console 115 for generating 2D and/or 3D renderings of image data in accordance with the data processing results, such as segmentation of organs or anatomical structures, color or intensity variations, and so forth.

Figure 2:
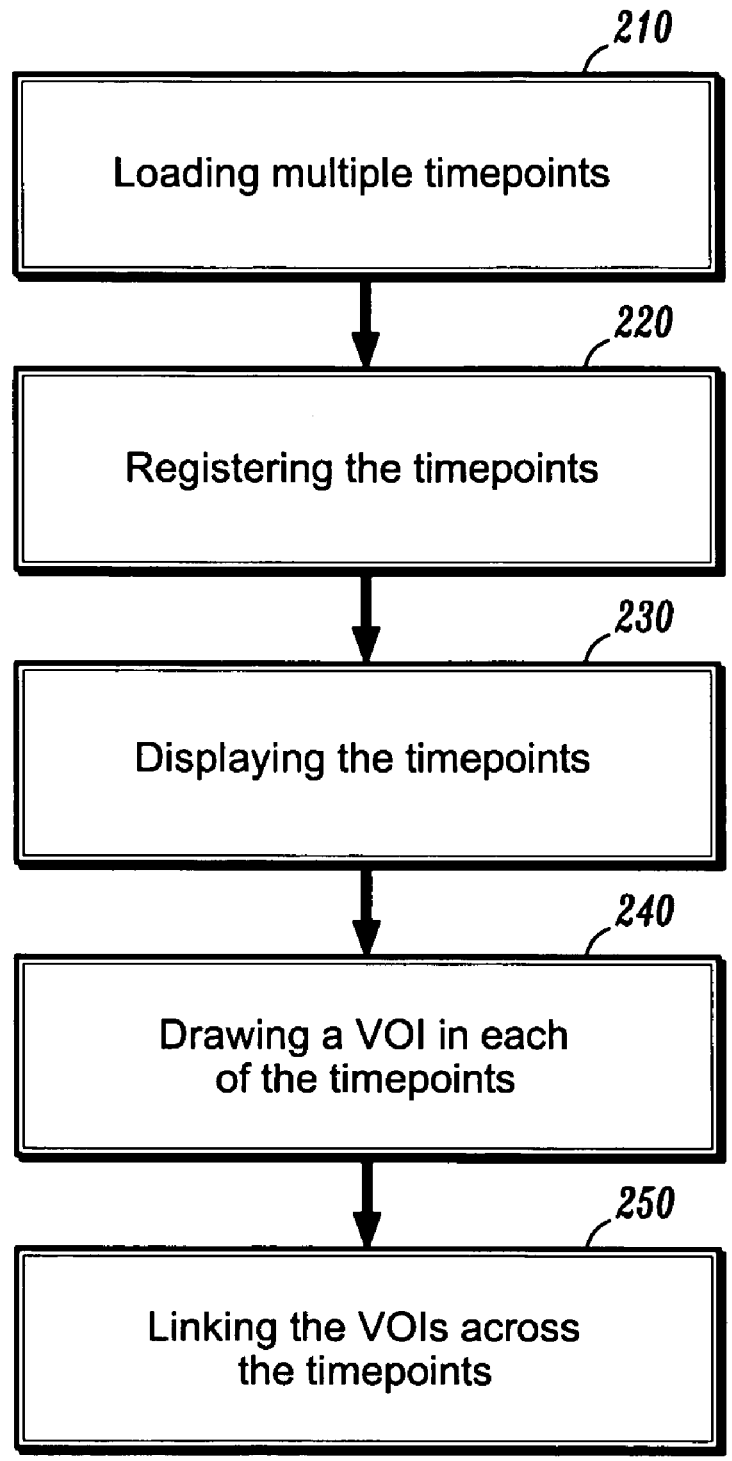
FIG. 2 is a flowchart illustrating a method for linking VOIs across timepoints according to an exemplary embodiment of the present invention.
Figure 3:
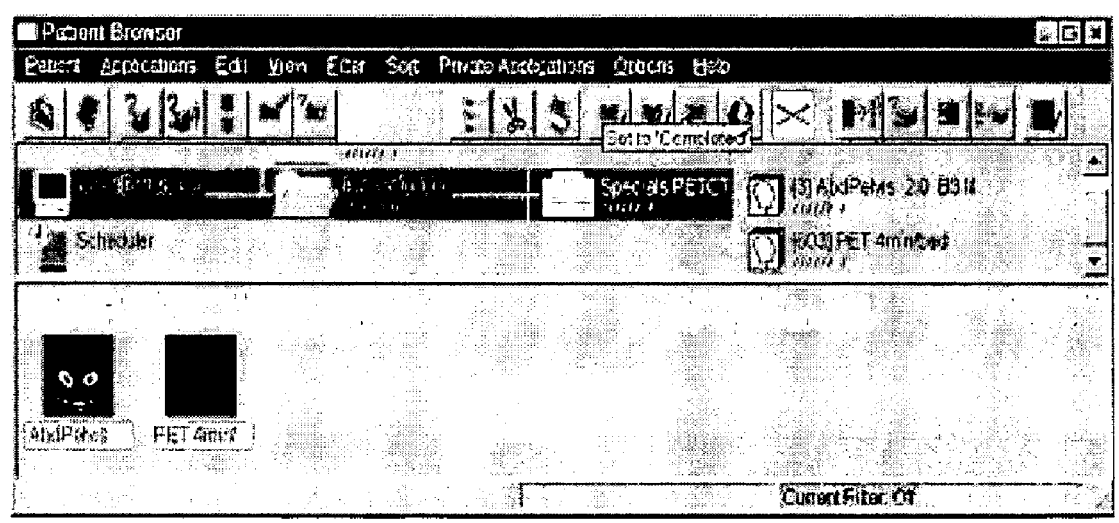
FIG. 3 is a patient browser for selecting a timepoint to be loaded according to an exemplary embodiment of the present invention.

FIG. 2 is a flowchart illustrating a method for linking VOIs across timepoints according to an exemplary embodiment of the present invention. As shown in FIG. 2, a user loads multiple timepoints via a patient browser 300 of FIG. 3 (210). This is accomplished by selecting an image dataset of a first timepoint. The image dataset of the first timepoint may include one of the following combinations of image series: a single CT series; a single PET series; a single SPECT series; a combination of a CT and PET series from the same study or from different studies; and a combination of a CT and SPECT series from the same study or from different studies. Exemplary dataset combinations for a single timepoint are listed below in Table 1.

TABLE 1

DATASETS OR COMBINATIONS
FOR A SINGLE TIMEPOINT

A single CT series
A single PET-AC series
A single PET-NAC series
A single SPECT-AC series
A single SPECT-NAC series
CT series + PET-AC series
CT series + PET-NAC series
CT series + SPECT-AC series
CT series + SPECT-NAC series
A single MR series
MR series + PET-AC series TABLE 1-continued

DATASETS OR COMBINATIONS
FOR A SINGLE TIMEPOINT

Figure 4:
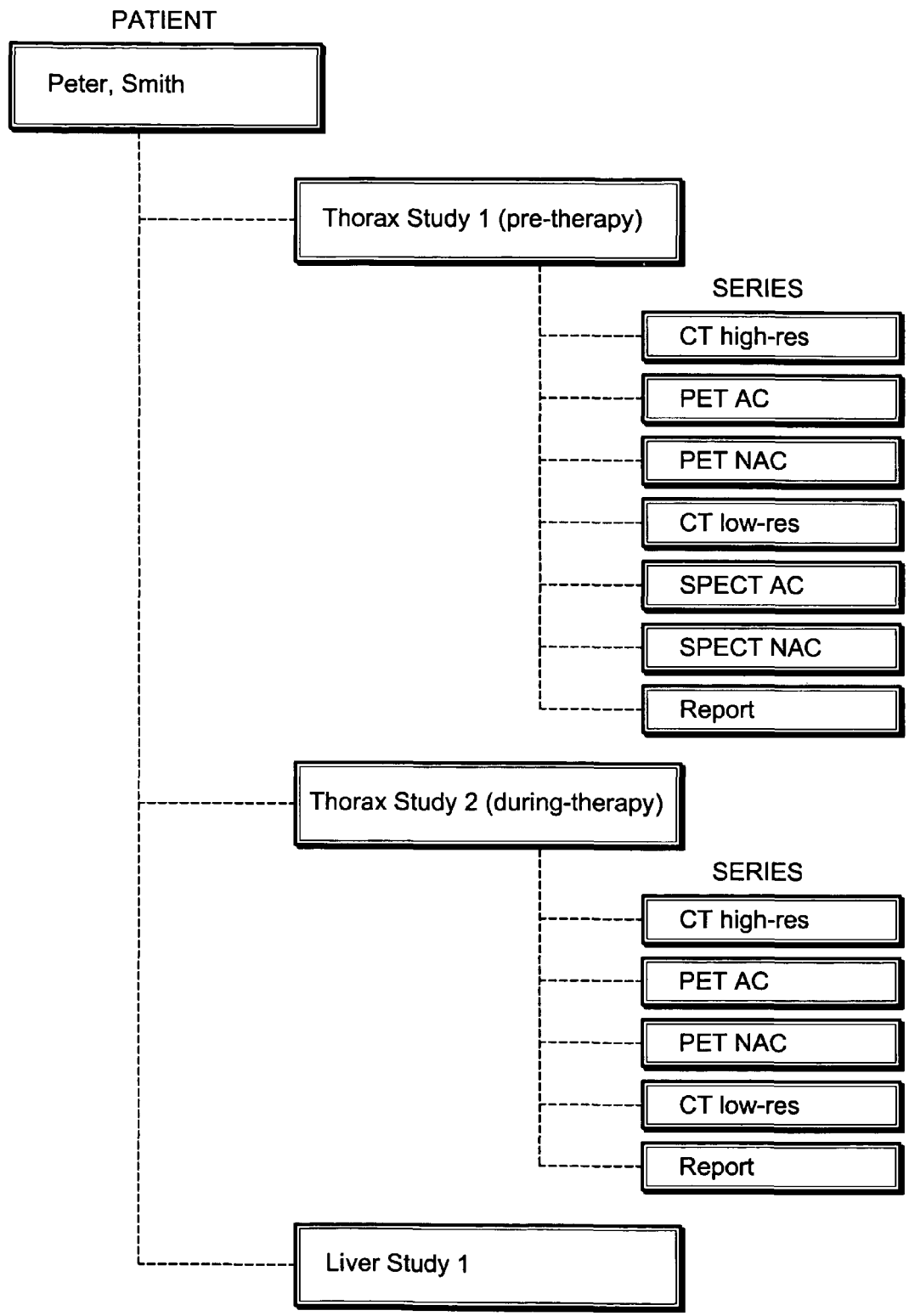
FIG. 4 is a chart illustrating a hierarchy for creating a timepoint according to an exemplary embodiment of the present invention.

MR series + PET-NAC series
MR series + SPECT-AC series
MR series + SPECT-NAC series The image datasets of the first timepoint and subsequent timepoints could be from pre-therapy, during-therapy or post-therapy studies. In addition, the same image series can be included as a series in both the first timepoint and subsequent timepoints. For example, in a sample patient hierarchy depicted in FIG. 4, a high-resolution CT series and PET AC series could be combined to form the first timepoint and the high-resolution CT series and a PET NAC series could be combined to form a second timepoint. In other words, a single timepoint could contribute to the first and second timepoints.

After selecting the image dataset of the first timepoint, the image dataset is loaded. The image dataset can be loaded in the following ways: dragging and dropping the selected image dataset from the patient browser 300 onto a display area; clicking an extension button on the patient browser 300 and double-clicking relevant data on the patient browser 300. For example, a user can perform the relevant selection in the patient browser 300 and click a button for loading. The level of selection of the data in the patient browser 300 can be at series, study or at the patient level.

An image series containing unequidistant slices or overlapping slices can also be loaded. In addition, multi-frame images and different types of NM images such as NM RECON TOMO (e.g., a volume as a number of frames within a single image) can be loaded. Further, spiral CT scan data can be loaded. Once such data is loaded it is validated using image header information. Thus, when studies containing different patient header information for single as well as multiple timepoints are selected for loading, a warning dialog may pop-up to indicate to the user that the patient IDs are different and thus indicate the correct manner for loading an image series. The warning dialog may also be used to prompt the user to modify the patient IDs. After the data is validated a volume is constructed based on the series.

Once the image dataset of the first timepoint is loaded, an image dataset of a second timepoint may be selected. The image dataset of the second timepoint may be selected similar to that of the image dataset of the first timepoint. In addition, the second timepoint may be one of the image series described above for the first timepoint. After selecting the second timepoint for loading, it is loaded. Again, the second timepoint is loaded using one of the techniques described above for the loading the first timepoint.

When loading the second timepoint, it is determined if it is a valid combination of datasets for multiple timepoint loading and then sorted. A list of the valid combination of datasets for multiple timepoint loading is shown below in Table 2.

TABLE 2

| FIRST TIMEPOINT | SECOND TIMEPOINT |
| --- | --- |
| PET AC alone or with NAC | PET AC alone or with NAC |
| | PET AC alone or with NAC + CT |
| | PET AC alone or with NAC + MR |
| | SPECT |
| SPECT AC alone or with NAC | SPECT AC alone or with NAC |
| | SPECT AC alone or with NAC + CT |
| | SPECT AC alone or with NAC + MR |
| | PET |

TABLE 2-continued

| FIRST TIMEPOINT | SECOND TIMEPOINT |
| --- | --- |
| CT | CT |
| | CT + PET AC alone or with NAC |
| | CT + SPECT AC alone or with NAC |
| | MR |
| MR | MR |
| | MR + PET AC alone or with NAC |
| | MR + SPECT AC alone or with NAC |
| | CT |
| PET AC alone or with NAC + CT | PET AC alone or with NAC |
| | CT |
| | PET AC alone or with NAC + CT |
| | MR |
| | SPECT |
| SPECT AC alone or with NAC + CT | SPECT AC alone or with NAC |
| | CT |
| | SPECT AC alone or with NAC + CT |
| | MR |
| | PET |

Figure 5:
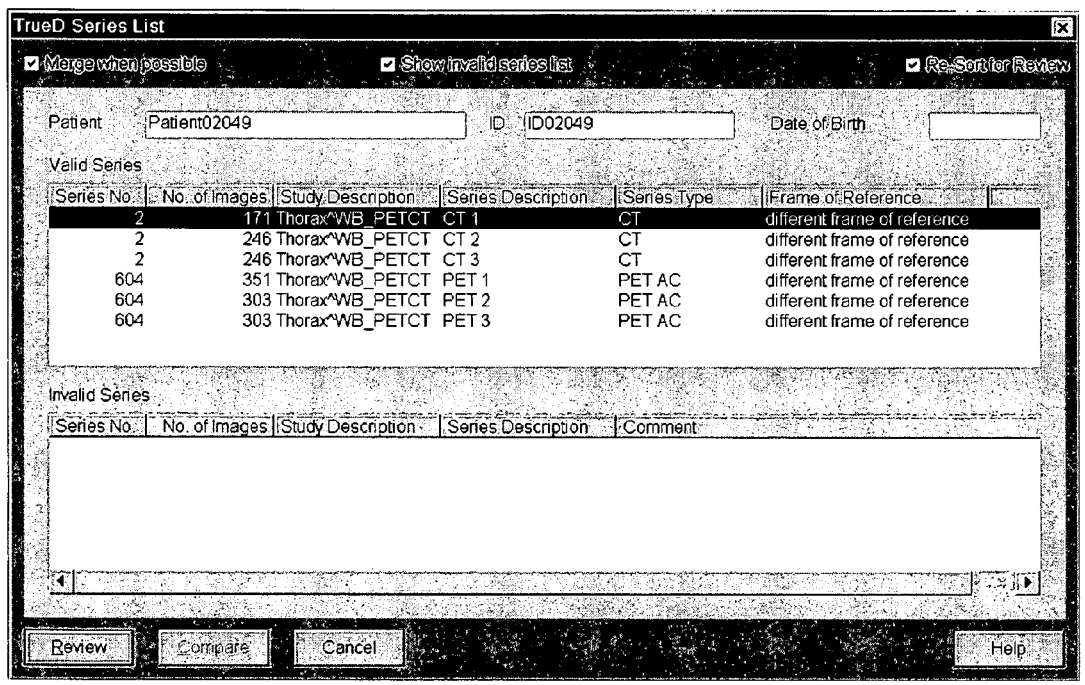
FIG. 5 is a series list dialog showing valid and invalid image series of timepoints for loading according to an exemplary embodiment of the present invention.

As shown in Table 2, if for example, a first timepoint is already loaded containing a SPECT AC dataset alone or with a NAC dataset, any one of the SPECT NAC dataset from the first timepoint, SPECT AC dataset alone or with the NAC dataset and a SPECT AC dataset alone or with an NAC dataset and a CT dataset may be loaded as the second timepoint. If, however, the second timepoint is not one of the valid combinations of datasets for loading, then a series dialog 500 of FIG. 5 may be displayed indicating valid combinations of datasets for loading to the user.

As further shown in Table 2, the PET or SPECT AC and NAC datasets are not listed separately because it is assumed that whenever the user selects the PET AC dataset and loads, the PET AC dataset will be displayed. Similarly, when the user selects the PET NAC dataset and loads, the PET NAC dataset will be loaded and displayed along with a CT dataset. The user can then toggle between the PET AC and PET NAC datasets. The same functionality also holds true for the SPECT AC/NAC datasets.

After the image datasets of the first and second timepoints have been loaded, they are registered (220). Registration is the process of aligning medical image data. In other words, it is a procedure used to align two input image series generated by different modalities or by one modality at different times. During registration, one of the datasets will be fixed, e.g., in an unchanged position, and the other data set will be transformed, e.g., translated, rotated and scaled to align the two datasets. The fixed dataset may also be referred to as the reference volume and the dataset to be transformed may be referred to as the model volume. Thus, a geometrical transformation is performed for the model volume to match the anatomy of the reference volume.

In step 220, the several registration methods/algorithms may be used. They may be, for example: automatic/mutual information registration (e.g., automatic registration); landmark registration and visual alignment (e.g., manual matching).

Automatic registration is a fully automated matching algorithm based on mutual information or normalized mutual information. Prior to initiating automatic registration, however, the user could perform a visual alignment to improve the performance of the automatic registration. Registration can also be performed while loading the multiple timepoints in step 210.

Automatic registration comprises the steps of: registering a first image series with a second image series of the first image dataset of the first timepoint; registering the first image series of the first image dataset of the first timepoint with a first image series of the second image dataset of the second timepoint; and registering the first image series of the second image dataset of the second timepoint with a second image series of the second image dataset of the second timepoint.

For example, when two CT-PET scans are loaded, registration of the CT-PET scans begins for both first and second timepoints in sequence. Once the CT-PET registrations are completed, a registration is initiated to match the two CT studies across the first and second timepoints. While the automatic registration takes place, the progress of the registration can be visualized in alpha blended images (e.g., fused images). A progress text may also be displayed indicating the current progress of the automatic registration.

Landmark registration is the identification of known marks at unisonous positions in both image series. From that identification, the algorithm calculates the registration. Visual alignment is done on a fused dataset. Here, the reference series remains fixed and using, for example, visual alignment controls, the model series can be translated/rotated to align with the reference image.

After registering the image datasets of the first and second timepoints, they are displayed (230). They may be displayed, for example, on a display area 610 of a user interface 600 of FIG. 6A. It is to be understood that each of the image datasets of the first and second timepoints could be displayed as soon as they are loaded. In addition, the image datasets of the first and second timepoints could be displayed as they are being registered.

Once the image datasets of the first and second timepoints are displayed, the user may then draw a VOI in each of the timepoints (240). This may be accomplished by a user selecting a tool from a tools area 640 of a contour pane 630 in a control area 620 of the user interface 600. The tool may be, for example, an ellipse tool for creating ellipsoidal objects or a free-form iso-contour tool for creating isometric objects. The tool may then be used to draw a boundary around, for example, a lesion in an image being displayed in the display area 610. The VOI is formed by taking the 2D contours drawn around the lesion and converting them into a 3D irregular solid representing the lesion in the volume. The 3D VOI is used to show the contours of the VOI.

After the VOIs have been drawn in each of the timepoints, the timepoints may be linked (250). The timepoints are linked by: automatically copying contours from one timepoint to another or a by user selecting a particular contour and clicking on a button to copy the selected contour from one timepoint to another. The VOIs are linked because once the image datasets are registered, valid registration results become available. In addition, when copying contours, target voxel coordinates are determined by applying a transformation using a registration result. The valid combinations of datasets for multiple timepoint loading shown above in Table 2 are also used for linking VOIs across timepoints. Once the VOIs are linked across timepoints they may be used by a medical practitioner to, for example, track changes in lesion size or generate comparison information.

In an alternative linking embodiment, the user may perform a smart-select on the VOI in the second timepoint and then select an option to link to another timepoint. Subsequently, the user may perform a smart-select on a VOI in a first timepoint and select an option to accept the link. The two VOIs will then be linked. Because the image datasets are registered, if the user tries to link the VOIs in spatially inconsistent locations, a warning message may be provided indicating that a threshold associated with spatial difference has been exceeded. It is to be understood that linked VOIs may be unlinked by simply selecting a button on the control area 620 of the user interface 600 that is associated with removing the link.

Figure 6A:
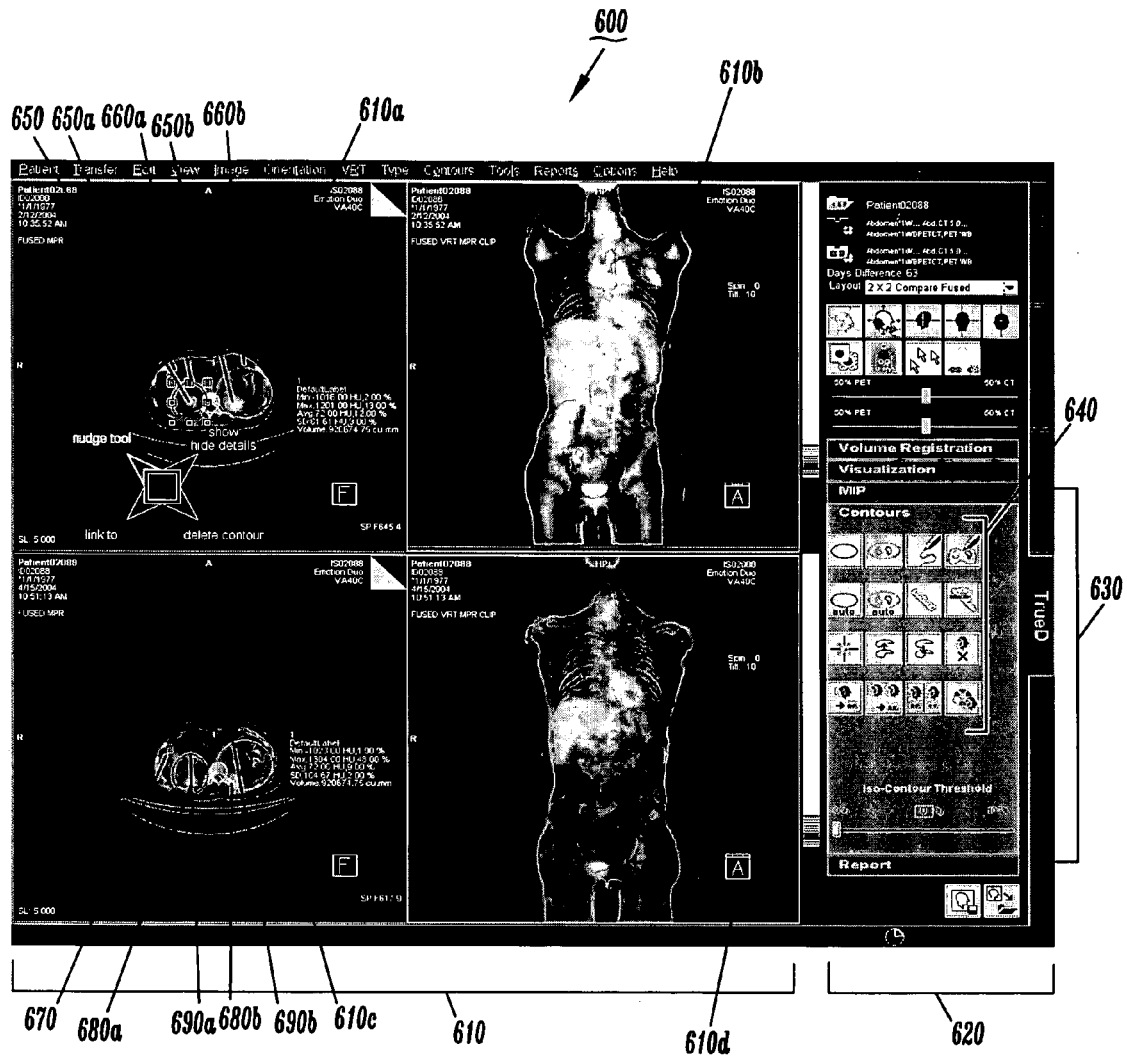
FIGS. 6A and 6B illustrate a user interface according to an exemplary embodiment of the present invention.
Figure 6B:
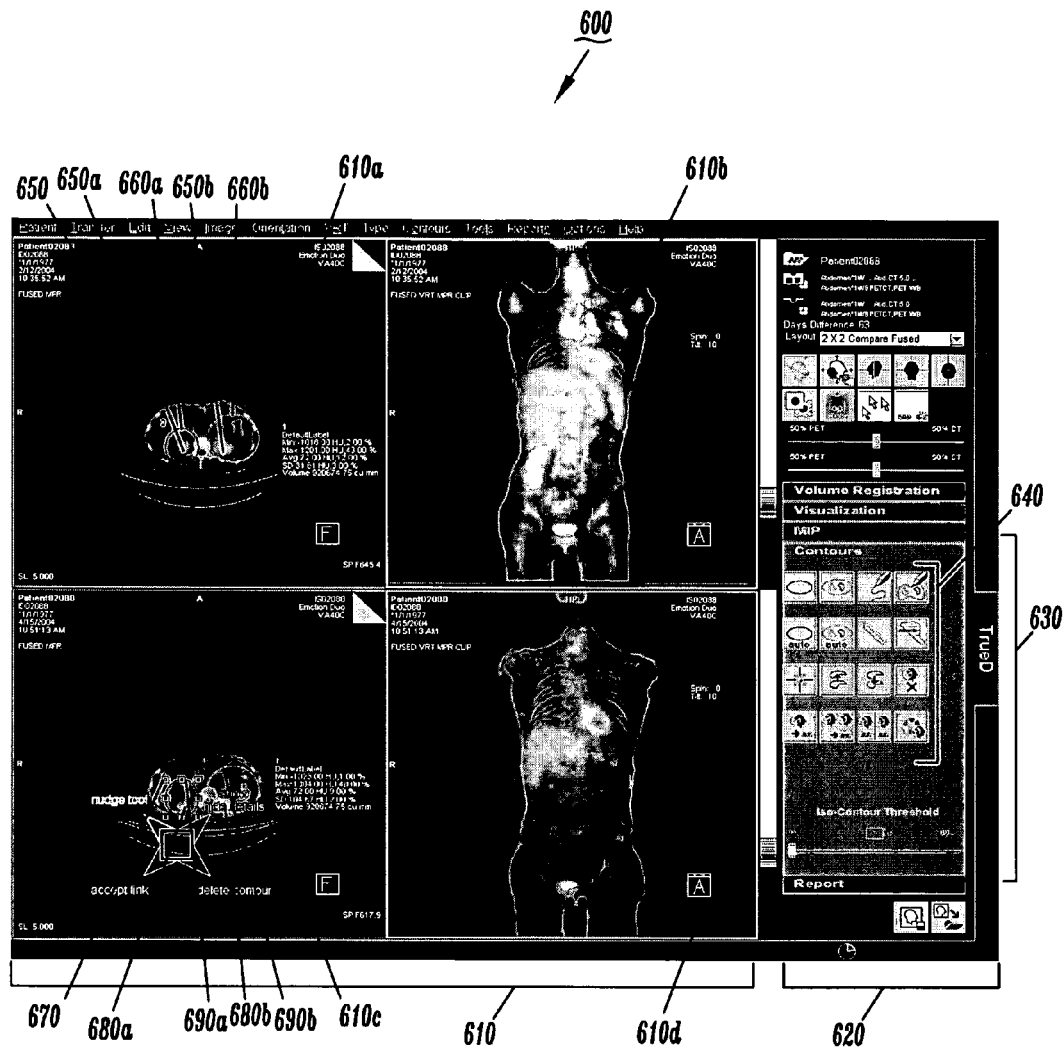

An example of linking VOIs across timepoints is illustrated on the user interface 600 of FIG. 6A and FIG. 6B. As shown in FIG. 6A, the display area 610 is divided into several areas, for example, a first axial or transaxial display area 610a; coronal display area 610b; second axial or transaxial display area 610c and fused display area 610d. The first axial display area 610a includes an image 650 of CT and PET data rendered with image fusion that includes two potential cancerous lesions 650a and 650b. Surrounding the potential cancerous lesions 650a and 650b are two circular boundaries 660a and 660b. The two circular boundaries 660a and 660b are VOIs that were drawn by a user using a tool from the tools area 640 of the contour pane 630.

As further shown in FIG. 6A, the second axial display area 650c illustrates an image 670 that includes two potential cancerous lesions 680a and 680b surrounded by two circular boundaries 690a and 690b. The image 670 is an image of the CT and PET data rendered with image fusion shown in image 650 except that it is from another timepoint. Referring back to the first axial display area 610a, a user is in the process of linking the two circular boundaries or VOIs 660a and 660b with the circular boundaries or VOIs 690a and 690b. This is accomplished by using a tool of the control area 620 to select the two VOIs 660a and 660b for linking with the two VOIs 690a and 690b. Once the two VOIs 660a and 660b have been selected for linking with the two VOIs 690a and 690b, the user may accept the link as shown in the second axial display area 610c of FIG. 6B.

Figure 7:
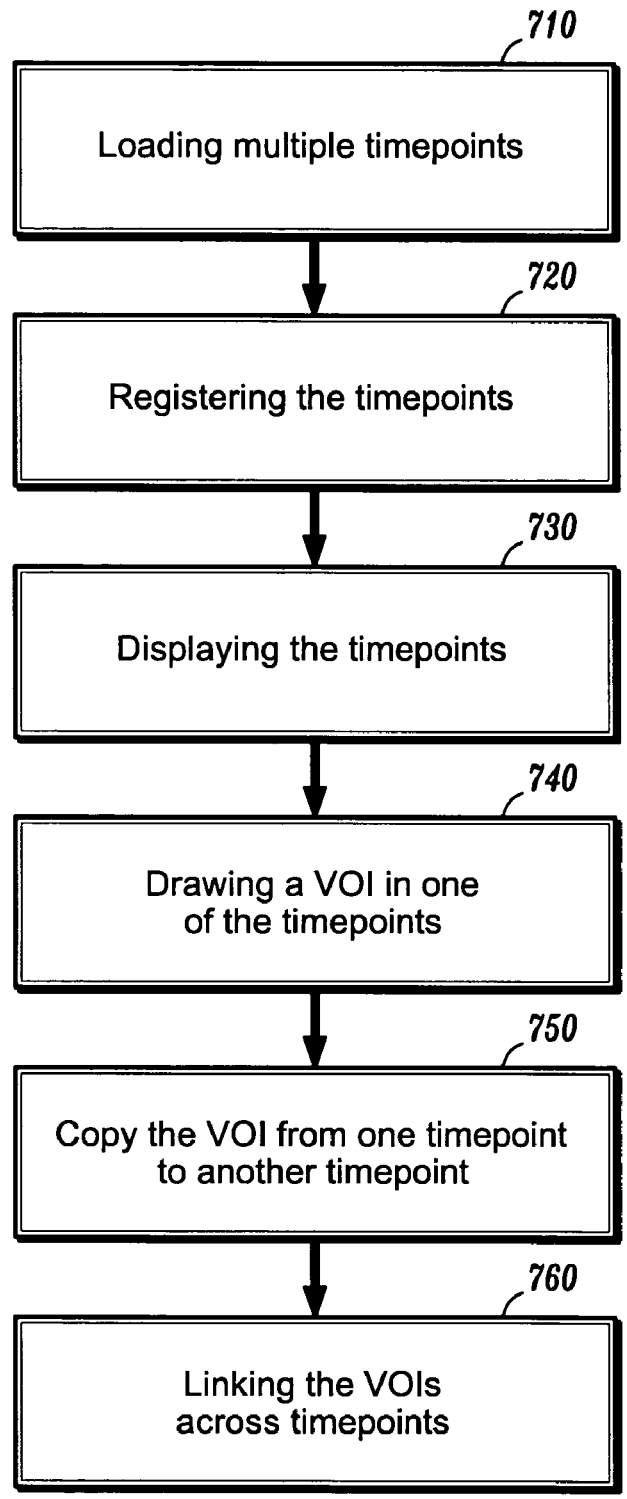
FIG. 7 is a flowchart illustrating a method for linking VOIs across timepoints according to another exemplary embodiment of the present invention.

FIG. 7 is a flowchart illustrating a method for linking VOIs across timepoints according to another exemplary embodiment of the present invention. As shown in FIG. 7, multiple timepoints are loaded (710). The timepoints are loaded as described above with reference to step 210 of FIG. 2. Subsequently, the timepoints are registered (720) and then displayed (730). These steps may also take place in accordance with steps 220 and 230 of FIG. 2. After images associated with the loaded timepoints are displayed, a user may draw a VOI in one of the timepoints (740). This may be accomplished by a user selecting a tool from the tools area 640 of the user interface 600 and drawing a boundary around, for example, a lesion in an image being displayed.

Figure 8:
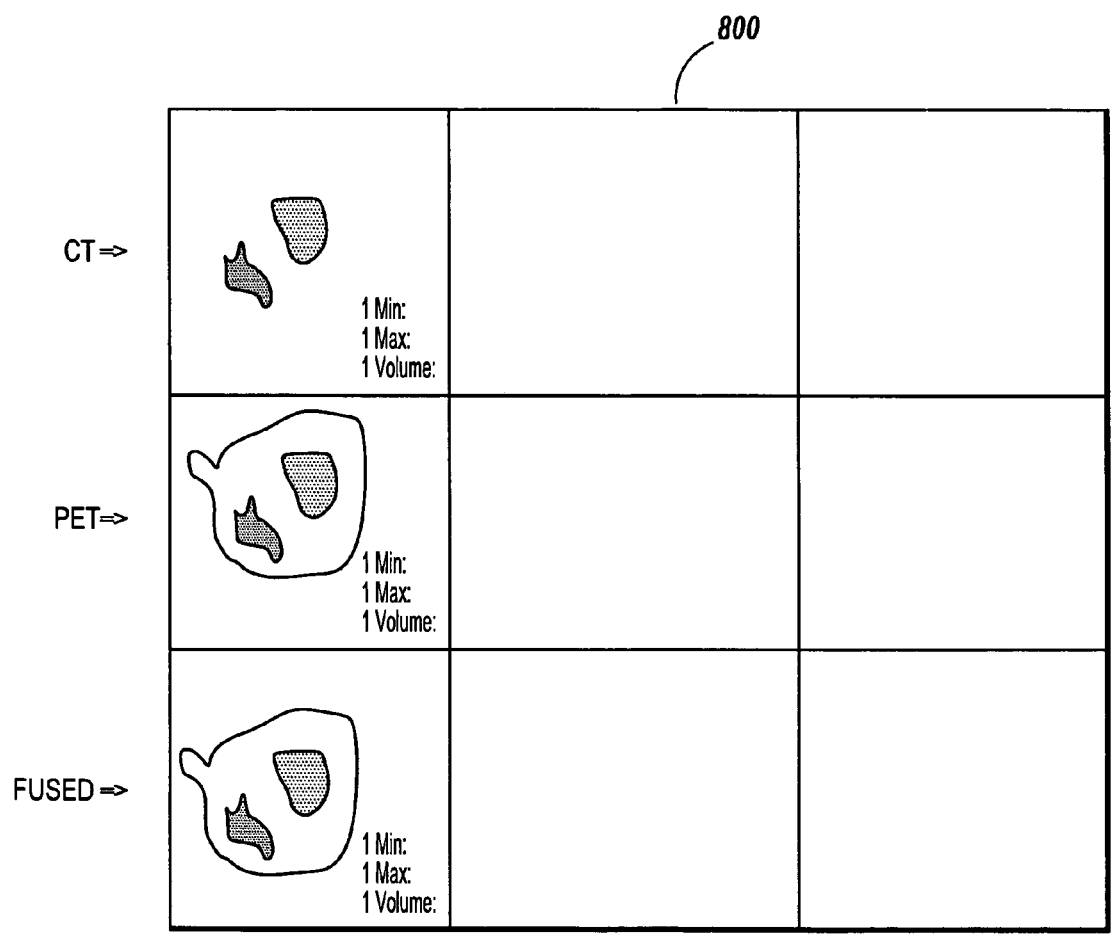
FIG. 8 is a VOI iso-contouring on a display area of a user interface according to an exemplary embodiment of the present invention.
Figure 9:
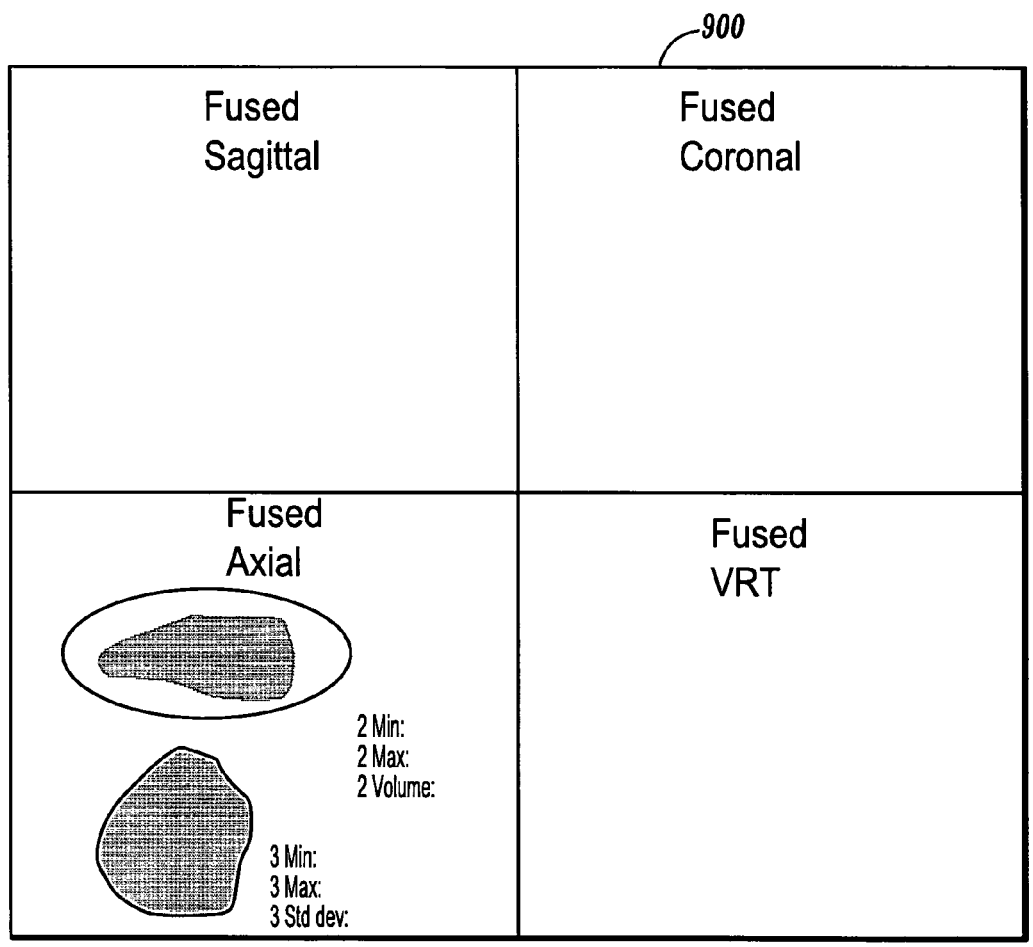
FIG. 9 is a free-form contouring using an elliptical contour on a display area of a user interface according to an exemplary embodiment of the present invention.

An example of drawing a VOI around a lesion using iso-contouring on a 3×3 layout of a display area 800 is shown in FIG. 8. In particular, FIG. 8 illustrates an iso-contoured objected being depicted in different modalities of images and fused images. When a user draws a VOI on, for example, a PET image, the VOI is automatically copied onto a CT image at the appropriate voxel coordinate obtained by applying transformations using the registration results between PET and CT images. Further, the VOI may be displayed on fused images. In addition to using the ellipse or free-form iso-contour tool discussed above with reference to step 240 of FIG. 2, the user may manually draw a boundary around the lesion using a free-from VOI tool. An example of a free-form contouring using an elliptical contour in a 2×2 layout of a display area 900 is shown in FIG. 9.

Once the VOI has been drawn in one of the timepoints, a user may then copy the VOI to another timepoint (750). This is accomplished by a user selecting the VOI and clicking on a button in the tools area 640 of the user interface 600 that is associated with copying a selected VOI to another timepoint. For example, the user may select a VOI in a first timepoint and click on the copying button. The selected VOI is then copied onto a second timepoint at the appropriate voxel coordinate. It is to be understood that the voxel coordinates are consistent because the image datasets are assumed to be registered at this point. Once the VOIs are copied, the VOIs are automatically linked (760) using the techniques described above in step 250 of FIG. 2.

It is to be understood that in step 750, the VOIs or contours drawn by the user can be copied to the next or previous image slice. This will copy the drawn contour on the same 2D point of the slice next to or before the current slice. The copied contours may also be nudged to properly bind to a lesion spot using a nudge tool of the tools area 630 of the user interface 600. It is to be further understood that all VOIs may be copied from one timepoint to another in step 750. For example, the user may select a timepoint by clicking on a timepoint icon in the control area 620 of the user interface 600. The user may then click on the copy button. This will cause all VOIs in a first timepoint to be copied at their respective voxel coordinates in a first timepoint. The VOIs will then be linked.

After the VOIs have been linked across timepoints, the tracking of changes and generation of comparison information associated therewith is enabled. For example, the ratio of average values between the two VOIs can be calculated. In addition, lesion to background or lesion to reference ratios can be calculated. The VOIs may also be quantified. For example, when quantifying the VOIs, the user may select any VOI marked over a lesion to know certain quantification parameters associated therewith. The quantification parameters may be minimum, maximum, standard deviation, average, volume and mean of the VOI.

It is to be understood that in addition to VOIs and segments in an area of a display being linked, a variety of operations can be linked in accordance with the present invention. For example, a zoom and pan operation can be linked across timepoints, an orientation change and the scrolling through image slices can be linked across timepoints. In addition, synchronized viewing of an image plane between various image planes, masking and blending operations can be linked across timepoints.

According to an exemplary embodiment of the present invention, medical practitioners can efficiently compare patient scans from two different time points (e.g., pre- and post-therapy). By automatically registering and displaying PET/CT or SPECT-CT image from studies acquired at different times, the present invention assists medical practitioners in making better-informed diagnostic, therapy and follow-up decisions. For example, the present invention provides for the display of volume-rendered CT images fused with functional PET or SPECT datasets. It also enables VOIs to be drawn that calculate standardized uptake values (SUV) within lesions. In addition, VOIs can be copied from one study to the appropriate voxel coordinates of a comparison study.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for linking volumes of interest (VOIs) across timepoints and across modalities, comprising:
loading a first image dataset comprising image data acquired at a first timepoint using a first imaging modality selected from one of: computed tomography (CT), positron emission tomography (PET), single photon emission computed tomography (SPECT), magnetic resonance (MR) and ultrasound;
loading a second image dataset comprising image data acquired at a second timepoint using a second imaging modality selected from one of: computed tomography (CT), positron emission tomography (PET), single photon emission computed tomography (SPECT), magnetic resonance (MR) and ultrasound, wherein the first imaging modality is different from the second imaging modality;
registering the first image dataset and the second image dataset with each other;
displaying the first image dataset and the second image dataset on a computer screen at the same time;
receiving a manually drawn boundary to demarcate a VOI in the first image dataset;
automatically copying the VOI from the first image dataset to a corresponding area in the second image dataset, wherein the corresponding area is obtained by applying a transformation using a result of the registration; and
linking the VOI in the first image dataset the VOI copied to the second image dataset,
wherein the method is performed using a processor.

2. The method of claim 1, wherein the first image dataset and the second image dataset each comprise one of a CT image series and MR image series, a PET image series and SPECT image series, a combination of a CT and PET image series, a combination of an MR and PET image series, a combination of a CT and SPECT image series, a combination of an MR and SPECT image series and an ultrasound image series.

3. The method of claim 2, wherein the image series in the first image dataset and the second image dataset comprise data from one of a pre-therapy, ongoing therapy and post-therapy study.

4. The method of claim 1, wherein the VOI is one of a lesion, tumor and cancerous region.

5. The method of claim 1, further comprising:
quantifying the VOIs.

6. The method of claim 5, further comprising:
detecting a change in the VOIs.

7. A system for linking volumes of interest (VOIs) across timepoints and across modalities, comprising:
a memory device for storing a program;
a processor in communication with the memory device, the processor operative with the program to:

load a first image dataset comprising image data acquired at a first timepoint using a first imaging modality selected from one of: computed tomography (CT), positron emission tomography (PET), single photon emission computed tomography (SPECT), magnetic resonance (MR) and ultrasound;

load a second image dataset comprising image data acquired at a second timepoint using a second imaging modality selected from one of: computed tomography (CT), positron emission tomography (PET), single photon emission computed tomography (SPECT), magnetic resonance (MR) and ultrasound, wherein the first imaging modality is different from the second imaging modality;

register the first image dataset and the second image dataset with each other;

display the first image dataset and the second image dataset on a computer screen at the same time;

receive and display a boundary that was manually drawn to demarcate a VOI in the first image dataset;

automatically copy the VOI from the first image dataset to a corresponding area in the second image dataset, wherein the corresponding area is obtained by applying a transformation using a result of the registration; and link the VOI in the first image dataset with the VOI copied to the second image dataset.

* * * * *